US012001167B2

(12) United States Patent
Flores et al.

(10) Patent No.: US 12,001,167 B2
(45) Date of Patent: Jun. 4, 2024

(54) HIGH VISIBILITY FLUORESCENT YELLOW TONER AND TONER PROCESS

(71) Applicant: Xerox Corporation, Norwalk, CT (US)

(72) Inventors: Eliud Robles Flores, Rochester, NY (US); Yu Qi, Penfield, NY (US); Fan Shi, Penfield, NY (US); William G. Osbourne, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 398 days.

(21) Appl. No.: 16/676,971

(22) Filed: Nov. 7, 2019

(65) Prior Publication Data

US 2021/0141318 A1 May 13, 2021

(51) Int. Cl.

*G03G 9/09* (2006.01)
*G03G 9/093* (2006.01)
*G03G 15/01* (2006.01)

(52) U.S. Cl.

CPC ....... *G03G 9/09371* (2013.01); *G03G 9/0924* (2013.01); *G03G 9/0926* (2013.01); *G03G 9/09328* (2013.01); *G03G 9/09378* (2013.01); *G03G 9/09392* (2013.01); *G03G 15/0131* (2013.01)

(58) Field of Classification Search

CPC .. G03G 9/0908; G03G 9/08755; G03G 9/093; G03G 9/09307; G03G 9/09328; G03G 9/0935; G03G 9/09371

See application file for complete search history.

(56) References Cited

U.S. PATENT DOCUMENTS

| | | | |
|---|---|---|---|
| 4,935,326 A | 6/1990 | Creatura et al. | |
| 4,937,166 A | 6/1990 | Creatura et al. | |
| 5,021,314 A * | 6/1991 | Vercoulen | G03G 9/0902 430/108.2 |
| 6,063,827 A | 5/2000 | Sacripante et al. | |
| 7,361,441 B2 | 4/2008 | Itakura et al. | |
| 8,257,897 B2 | 9/2012 | Kazmaier et al. | |
| 8,962,228 B2 | 2/2015 | Iftime et al. | |
| 10,248,038 B1 | 4/2019 | Qi et al. | |
| 2010/0173239 A1 | 7/2010 | Iftime et al. | |
| 2017/0248859 A1* | 8/2017 | Sacripante | G03G 9/09385 |
| 2018/0335712 A1* | 11/2018 | Okita | G03G 9/09371 |

OTHER PUBLICATIONS

Eliud Robles Flores, et al., U.S. Appl. No. 16/180,713, filed Nov. 5, 2018, "System, Apparatus, And Method For Printing Large Format Media And Targeted Decurling Of Various Printing Processes," not yet published.

(Continued)

*Primary Examiner* — Peter L Vajda
(74) *Attorney, Agent, or Firm* — Marylou J. Lavoie, Esq.

(57) ABSTRACT

A fluorescent yellow toner including a core comprising a first solvent yellow 160-incorporated amorphous polyester; a second solvent yellow 160-incorporated amorphous polyester; wherein the first amorphous polyester and the second amorphous polyester are different; and a crystalline polyester; a shell disposed over the core, the shell comprising at least one amorphous polyester; wherein the toner provides printed images having an L* value of greater than 90, an a* value of from about less than −40 to about −20, and a b*value of greater than 75. A process of printing the fluorescent yellow toner.

6 Claims, 7 Drawing Sheets

(56) References Cited

OTHER PUBLICATIONS

Eliud Robles Flores, et al., U.S. Appl. No. 16/180,762, filed Nov. 5, 2018, "Printable Media And Methods For Forming An Image On The Same," not yet published.
Wikipedia article entitled "CIELAB Color Space," available on the world wide web at online encyclopedia, Wikipedia, at https://en.wikipedia.org/wiki/CIELAB_colo_space, last edited Feb. 6, 2020.

* cited by examiner

HIGH VISIBILITY FLUORESCENT YELLOW TONER AND TONER PROCESS

BACKGROUND

Disclosed herein is a fluorescent yellow toner comprising a core comprising a first solvent yellow 160-incorporated amorphous polyester; a second solvent yellow 160-incorporated amorphous polyester; wherein the first amorphous polyester and the second amorphous polyester are different; and a crystalline polyester; a shell disposed over the core, the shell comprising at least one amorphous polyester; wherein the toner provides printed images having an L* value of greater than 90, an a* value of from about less than −40 to about −20, and a b*value of greater than 75.

Further disclosed is a process comprising combining a first amorphous polyester, a second amorphous polyester, wherein the first amorphous polyester and the second amorphous polyester are different, water, and solvent yellow 160 to prepare a fluorescent latex comprising a first solvent yellow 160-incorporated amorphous polyester and a second solvent yellow 160-incorporated amorphous polyester; optionally, adding an aggregating agent to the fluorescent latex; heating the fluorescent latex to form aggregated particles; adding a shell resin to the aggregated toner particles, the shell comprising at least one amorphous polyester; and heating to coalesce the particles forming coalesced toner particles; and recovering the coalesced toner particles; wherein the toner provides printed images having an L* value of greater than 90, an a* value of from about less than −40 to about −20, and a b* value of greater than 75.

Further disclosed is a process for using a fluorescent yellow toner, wherein the toner comprises a core comprising a first solvent yellow 160-incorporated amorphous polyester; a second solvent yellow 160-incorporated amorphous polyester; wherein the first amorphous polyester and the second amorphous polyester are different; and a crystalline polyester; a shell disposed over the core, the shell comprising at least one amorphous polyester; the process comprising: forming an image comprising the fluorescent yellow toner sing a xerographic printer; transferring the image comprising the fluorescent yellow toner to an image receiving medium; and fusing the fluorescent yellow toner to the image receiving medium to form a toner image; wherein the toner provides printed images having an L* value of greater than 90, an a* value of from about less than −40 to about −20, and a b* value of greater than 75.

The ability to print high visibility applications is of great value in many industries. High visibility print applications can be thought of as containing elements that exalt print to a unique higher ground of attention-grabbing power not believed possible with current methods. Examples of these elements include high resolution, large size, high brightness, high reflection, unique color, and movement. Consider what draws ones attention more, a small window poster printed on a low resolution desktop printer or a large poster that reads SALES in combinations of super bright yellow or red? What makes you look twice when driving, a walker in black and white attire or a runner in a piercing yellow (or is it green?) t-shirt that you can see a mile away? Current methods of printing high visibility applications may include one or two of the elements described above. What is needed is the ability to achieve three or four elements at once, for example, three or four of the following: high resolution, large size, unique color, high brightness.

U.S. patent application Ser. No. 16/180,713, filed Nov. 5, 2018, entitled "System, Apparatus, And Method For Printing Large Format Media And Targeted Decurling Of Various Printing Processes," which is hereby incorporated by reference herein in its entirety, describes in the Abstract thereof a printer for producing a print media moving in a process direction including a print engine, a fuser, a full width array and a duplexing path. The print engine is operatively arranged to receive the print media and to apply a first dry marking material to a first surface of the print media. The fuser is arranged subsequently to the print engine in the process direction and is operatively arranged to receive the print media with the first dry marking material applied to the first surface of the print media and to fix the first dry marking material on the first surface using at least one of heat and pressure. The full width array is arranged subsequently to the fuser and is operatively arranged to obtain a first image of the first surface of the print media, the first image being used to quantify a flatness of the print media and/or image quality of the first image. The duplexing path is arranged subsequently to the full width array.

U.S. patent application Ser. No. 16/180,762, filed Nov. 5, 2018, entitled "Printable Media And Methods For Forming An Image On The Same," which is hereby incorporated by reference herein in its entirety, describes in the Abstract thereof a printable media including a carrier layer, a fabric layer and a first adhesive. The carrier layer includes a first surface having a first area, a second surface opposite the first surface, and a first rigidity. The fabric layer includes a third surface, a fourth surface opposite the third surface and including a second area, and a second rigidity less than the first rigidity. The fabric layer is secured to the carrier layer by the first adhesive bonding a first portion of the fourth surface to the first surface.

U.S. Patent Application Publication 2010/0173239, entitled "Low Melt Color Toners With Fluorescence Agents," which is hereby incorporated by reference herein in its entirety, describes in the Abstract thereof a low melt or ultra low melt toner includes at least one amorphous polyester of an alkoxylated bisphenol based polyester, a crystalline polyester derived from the reaction of an aliphatic dicarboxylic acid or aromatic dicarboxylic acid with an aliphatic diol, at least one colorant and at least one fluorescence agent. Methods of authentication of the toner, of authentication of documents formed from the toner, of embedding information in documents, and the like are also set forth.

Currently available toners and toner methods are suitable for their intended purposes. However a need remains for improved toners and processes for achieving high visibility prints for applications including advertisements, signage, science graphing, warning signs, among others. Further, a need remains for improved toners and toner processes that can achieve a combination of two or more of high resolution prints, long sheet/large size capability, unique color, high color brightness, and specifically yellow fluorescent color images.

The appropriate components and process aspects of the each of the foregoing U.S. patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a fluorescent yellow toner comprising a core comprising a first solvent yellow 160-incorporated amorphous polyester; a second solvent yellow 160-incorporated amorphous polyester; wherein the first amorphous polyester and the second amorphous polyester are different; and a crystalline polyester; a shell disposed over the core, the shell comprising at least one amorphous polyester; wherein the toner provides printed images having an L* value of greater than 90, an a* value of from about less than −40 to about −20, and a b*value of greater than 75.

Also described is a process comprising combining a first amorphous polyester, a second amorphous polyester, wherein the first amorphous polyester and the second amorphous polyester are different, water, and solvent yellow 160 to prepare a fluorescent latex comprising a first solvent yellow 160-incorporated amorphous polyester and a second solvent yellow 160-incorporated amorphous polyester; optionally, adding an aggregating agent to the fluorescent latex; heating the fluorescent latex to form aggregated particles; adding a shell resin to the aggregated toner particles, the shell comprising at least one amorphous polyester; and heating to coalesce the particles forming coalesced toner particles; and recovering the coalesced toner particles; wherein the toner provides printed images having an L* value of greater than 90, an a* value of from about less than −40 to about −20, and a b* value of greater than 75.

Also described is a process for using a fluorescent yellow toner, wherein the toner comprises a core comprising a first solvent yellow 160-incorporated amorphous polyester; a second solvent yellow 160-incorporated amorphous polyester; wherein the first amorphous polyester and the second amorphous polyester are different; and a crystalline polyester; a shell disposed over the core, the shell comprising at least one amorphous polyester; the process comprising: forming an image comprising the fluorescent yellow toner sing a xerographic printer; transferring the image comprising the fluorescent yellow toner to an image receiving medium; and fusing the fluorescent yellow toner to the image receiving medium to form a toner image; wherein the toner provides printed images having an L* value of greater than 90, an a* value of from about less than −40 to about −20, and a b* value of greater than 75.

DETAILED DESCRIPTION

Figure 1:
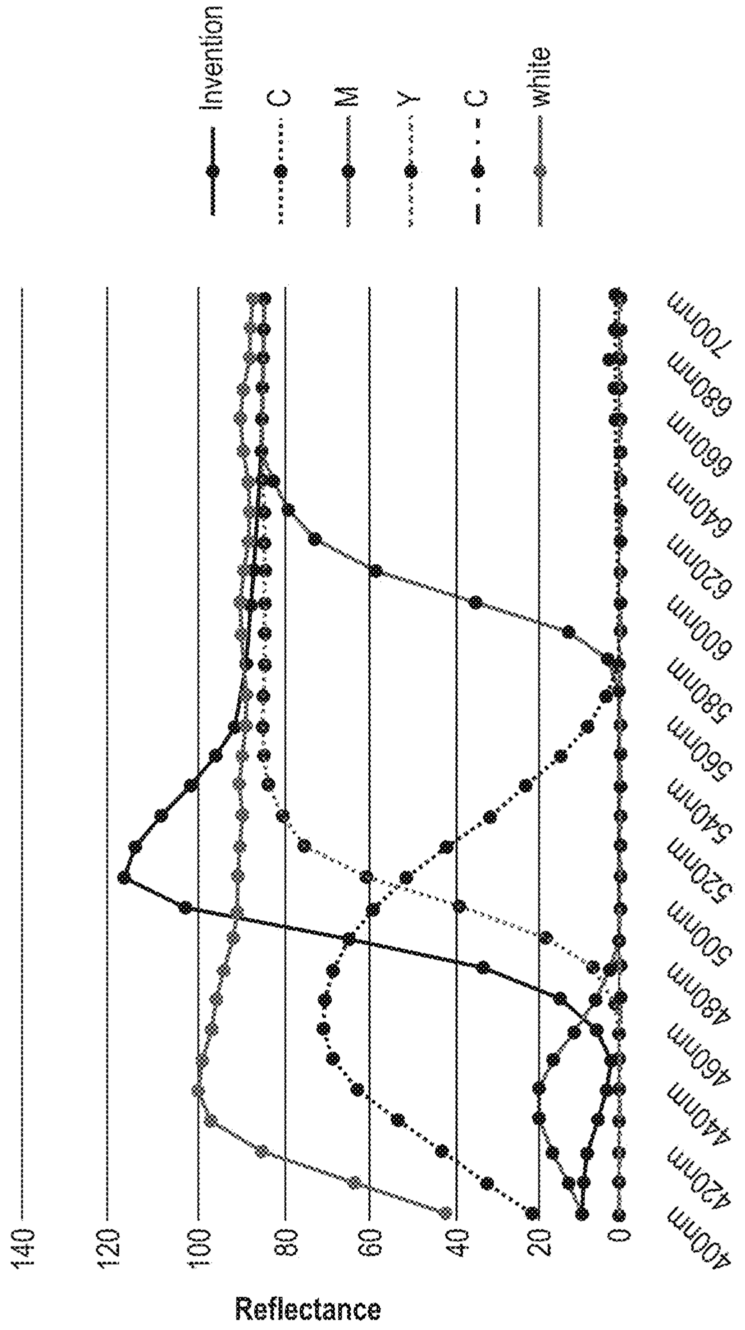
FIG. 1 is a graph showing reflectance (y-axis) versus wavelength (nanometer, x-axis) for the fluorescent yellow toner of the present embodiments and for cyan, magenta, regular yellow, black, and white.

In embodiments, a fluorescent yellow toner is described including a core comprising a first solvent yellow 160-incorporated amorphous polyester; a second solvent yellow 160-incorporated amorphous polyester; wherein the first amorphous polyester and the second amorphous polyester are different; and a crystalline polyester; a shell disposed over the core, the shell comprising at least one amorphous polyester; wherein the toner provides printed images having an L* value of greater than 90, an a* value of from about less than −40 to about −20, and a b*value of greater than 75.

The present toners comprise a combination of resins, some of which comprise solvent yellow-160 incorporated resins as described herein. The toner resins comprise a combination of amorphous resin and crystalline resin. In embodiments, the toner comprises a core-shell configuration wherein the core comprises a combination of first and second solvent yellow-160 incorporated amorphous resins and a crystalline polyester (crystalline resin not incorporated with solvent yellow 160) and a shell comprises at least one amorphous polyester.

Crystalline Resin.

The crystalline resin herein may be a crystalline polyester resin formed by reacting a diol with a diacid in the presence of an optional catalyst. For forming a crystalline polyester, suitable organic diols include aliphatic diols with from about 2 to about 36 carbon atoms, such as 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol, combinations thereof, and the like, including their structural isomers. The aliphatic diol may be, for example, selected in an amount of from about 40 to about 60 mole percent of the resin, from about 42 to about 55 mole percent of the resin, or from about 45 to about 53 mole percent of the resin, and a second diol may be selected in an amount of from about 0 to about 10 mole percent of the resin or from about 1 to 4 mole percent of the resin.

Examples of organic diacids or diesters including vinyl diacids or vinyl diesters selected for the preparation of crystalline resins include oxalic acid, succinic acid, glutaric acid, adipic acid, suberic acid, azelaic acid, sebacic acid, fumaric acid, dimethyl fumarate, dimethyl itaconate, cis-1,4-diacetoxy-2-butene, diethyl fumarate, diethyl maleate, phthalic acid, isophthalic acid, terephthalic acid, naphthalene-2,6-dicarboxylic acid, aphthalene-2,7-dicarboxylic acid, cyclohexane dicarboxylic acid, malonic acid and mesaconic acid, a diester or anhydride thereof. The organic diacid may be selected in an amount of, for example, from about 40 to about 60 mole percent of the resin, from about 42 to about 52 mole percent of the resin, or from about 45 to about 50 mole percent of the resin, and a second diacid can be selected in an amount of from about 0 to about 10 mole percent of the resin.

Polycondensation catalysts which may be utilized in forming crystalline (as well as amorphous) polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, or combinations thereof. Such catalysts may be utilized in amounts of, for example, from about 0.01 mole percent to about 5 mole percent based on the starting diacid or diester used to generate the polyester resin.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate), and mixtures thereof. Examples of polyamides include poly(ethylene-adipamide), poly(propylene-adipamide), poly(butylene-adipamide), poly(pentylene-adipamide), poly(hexylene-adipamide), poly(octylene-adipamide), poly(ethylene-succinimide), poly(propylene-sebecamide), and mixtures thereof. Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), poly(butylene-succinimide), and mixtures thereof.

In embodiments, the crystalline polyester is of the formula

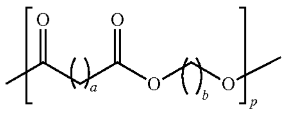

wherein each of a and b may range from 1 to 12, from 2 to 12, or from 4 to 12, and further wherein p may range from 10 to 100, from 20 to 80, or from 30 to 60. In embodiments, the crystalline polyester is poly(1,6-hexylene-1,12-dodecanoate), which may be generated by the reaction of dodecanedioc acid and 1,6-hexanediol.

The designation, "CX:CY," "CX:Y," "X:Y," and forms thereof as used herein describe crystalline resins, wherein C is carbon, X is a positive, non-zero integer identifying the number of methylene groups of the acid/ester monomer used to produce the crystalline polyester (CPE) and Y is a positive, non-zero integer identifying the number of methylene groups of the alcohol monomer used to produce the CPE. Thus, for example, C10 can represent, for example, a dodecanedioic acid and C6 can represent, for example, a hexanediol. X and Y each is 10 or lower. In embodiments, the sum of X and Y is 16 or lower. In certain embodiments, the sum and X and Y is 14 or lower.

In embodiments, the crystalline polyester is a C10:9 resin comprising polyester made from dodecanedioic acid (C10) and 1,9-nonanediol (C9).

As noted above, the crystalline polyesters may be prepared by a polycondensation process by reacting suitable organic diols and suitable organic diacids in the presence of polycondensation catalysts. A stoichiometric equimolar ratio of organic diol and organic diacid may be utilized, however, in some instances where the boiling point of the organic diol is from about 180° C. to about 230° C., an excess amount of diol, such as ethylene glycol or propylene glycol, of from about 0.2 to 1 mole equivalent, can be utilized and removed during the polycondensation process by distillation. The amount of catalyst utilized may vary, and can be selected in amounts, such as for example, from about 0.01 to about 1 or from about 0.1 to about 0.75 mole percent of the crystalline polyester resin.

The crystalline resin may be present in any suitable or desired amount. In embodiments, the crystalline resin may be present, for example, in an amount of from about 1% to about 85% by weight of the toner, from about 5% to about 50% by weight of the toner, or from about 10% to about 35% by weight of the toner.

The crystalline resin can possess various melting points of, for example, from about 30° C. to about 120° C., from about 50° C. to about 90° C. or from about 60° C. to about 80° C. The crystalline resin may have a number average molecular weight (Mn), as measured by gel permeation chromatography (GPC) of, for example, from about 1,000 to about 50,000, from about 2,000 to about 25,000, or from about 5,000 to about 20,000, and a weight average molecular weight (Mw) of, for example, from about 2,000 to about 100,000, from about 3,000 to about 80,000, or from about 10,000 to about 30,000, as determined by GPC. The molecular weight distribution (Mw/Mn) of the crystalline resin may be, for example, from about 2 to about 6, from about 3 to about 5, or from about 2 to about 4.

Amorphous Resin.

The amorphous resin may be an amorphous polyester resin formed by reacting a diol with a diacid in the presence of an optional catalyst. Examples of diacids or diesters including vinyl diacids or vinyl diesters utilized for the preparation of amorphous polyesters and include dicarboxylic acids or diesters such as terephthalic acid, phthalic acid, isophthalic acid, fumaric acid, trimellitic acid, dimethyl fumarate, dimethyl itaconate, cis-1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacids or diesters may be present, for example, in an amount from about 40 to about 60 mole percent of the resin, from about 42 to about 52 mole percent of the resin, or from about 45 to about 50 mole percent of the resin.

Examples of diols which may be utilized in generating an amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis (hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene, and combinations thereof. The amount of organic diols selected may vary, for example, the organic diols may be present in an amount from about 40 to about 60 mole percent of the resin, from about 42 to about 55 mole percent of the resin, or from about 45 to about 53 mole percent of the resin.

Examples of suitable amorphous resins include polyesters, polyamides, polyimides, polyolefins, polyethylene, polybutylene, polyisobutyrate, ethylene-propylene copolymers, ethylene-vinyl acetate copolymers, olypropylene, and the like, and mixtures thereof.

An unsaturated amorphous polyester resin may be utilized as a resin. Examples of such resins include those disclosed in U.S. Pat. No. 6,063,827, the disclosure of which is hereby incorporated by reference in its entirety. Exemplary unsaturated amorphous polyester resins include, but are not limited to, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly (propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof.

A suitable polyester resin may be an amorphous polyester such as a poly(propoxylated bisphenol A co-fumarate) resin. Examples of such resins and processes for their production include those disclosed in U.S. Pat. No. 6,063,827, the disclosure of which is hereby incorporated by reference in its entirety.

Suitable polyester resins include amorphous acidic polyester resins. An amorphous acid polyester resin may be based on any combination of propoxylated bisphenol A, ethoxylated bisphenol A, terephthalic acid, fumaric acid, and dodecenyl succinic anhydride, such as poly(propoxylated bisphenol-co-terephthalate-fumarate-dodecenylsuccinate). Another amorphous acid polyester resin which may be used is poly(propoxylated-ethoxylated bisphenol-co-terephthalate-dodecenylsuccinate-trimellitic anhydride).

An example of a linear propoxylated bisphenol A fumarate resin which may be utilized as a resin is available under the trade name SPAMII from Resana S/A Industrias Quimicas, Sao Paulo Brazil. Other propoxylated bisphenol A fumarate resins that may be utilized and are commercially available include GTUF and FPESL-2 from Kao Corporation, Japan, and EM181635 from Reichhold, Research Triangle Park, N.C., and the like.

An amorphous resin or combination of amorphous resins may be present, for example, in an amount of from about 5% to about 95% by weight of the toner, from about 30% to about 90% by weight of the toner, or from about 35% to about 85% by weight of the toner.

The amorphous resin or combination of amorphous resins may have a glass transition temperature of from about 30° C. to about 80° C., from about 35° C. to about 70° C., or from about 40° C. to about 65° C. The glass transition temperature may be measured using differential scanning calorimetry (DSC). The amorphous resin may have a Mn as measured by GPC of, for example, from about 1,000 to about 50,000, from about 2,000 to about 25,000, or from about 1,000 to about 10,000, and a Mw of, for example, from about 2,000 to about 100,000, from about 5,000 to about 90,000, from about 10,000 to about 90,000, from about 10,000 to about 30,000, or from about 70,000 to about 100,000, as determined by GPC.

One, two, or more resins may be used. Where two or more resins are used, the resins may be in any suitable ratio (e.g., weight ratio) such as for instance, of from about 1% (first resin)/99% (second resin) to about 99% (first resin)/1% (second resin), from about 10% (first resin)/90% (second resin) to about 90% (first resin)/10% (second resin). Where the resins include a combination of amorphous and crystal line resins, the resins may be in a weight ratio of, for example, from about 1% (crystalline resin)/99% (amorphous resin) to about 99% (crystalline resin)/1% (amorphous resin), or from about 10% (crystalline resin)/90% (amorphous resin) to about 90% (crystalline resin)/10% (amorphous resin). In some embodiments, the weight ratio of the resins is from about 80% to about 60% of the amorphous resin and from about 20% to about 40% of the crystalline resin. In such embodiments, the amorphous resin may be a combination of amorphous resins, e.g., a combination of two amorphous resins.

In embodiments, the solvent yellow 160 is present in an amount of from about 0.5 to about 5, or from about 1 to about 4, or from about 1.5 to about 3 percent by weight in each of the solvent yellow 160-incorporated amorphous resins.

In embodiments, the first solvent yellow 160-incorporated amorphous resin is present in an amount of from about 5 to about 80, or from about 20 to about 70, or from about 25 to about 50 percent by weight, based upon the total weight of the toner.

In embodiments, the second solvent yellow 160-incorporated amorphous resin is present in an amount of from about 5 to about 80, or from about 20 to about 70, or from about 25 to about 50 percent by weight, based upon the total weight of the toner.

In embodiments, the first solvent yellow 160-incorporated amorphous resin and the second solvent yellow 160-incorporated amorphous resin are present in the toner in equal amounts.

In embodiments, the toner core further comprises a third amorphous polyester resin and a fourth amorphous polyester resin, wherein the third and fourth amorphous polyester resins are not incorporated with solvent yellow 160. In embodiments, the third and fourth amorphous polyester resin are different. In embodiments, the third amorphous polyester resin is present in an amount of from about 1 to about 20, or from about 3 to about 18, or from about 5 to about 15 percent by weight, based upon the total weight of the toner. In embodiments, the fourth amorphous polyester resin is present in an amount of from about 1 to about 20, or from about 3 to about 18, or from about 5 to about 15 percent by weight, based upon the total weight of the toner. In certain embodiments, the third amorphous polyester is a poly(propoxylated bisphenol-co-terephthalate-fumarate-dodecenylsuccinate) and the fourth amorphous polyester is a poly(propoxylated-ethoxylated bisphenol-co-terephthalate-dodecenylsuccinate-trimellitic anhydride).

In embodiments, the third amorphous polyester resin and the fourth amorphous polyester resin are present in the toner core in equal amounts.

The resin(s) in the present toners may possess acid groups which may be present at the terminal of the resin. Acid groups which may be resent include carboxylic acid groups, and the like. The number of carboxylic acid groups may be controlled by adjusting the materials utilized to form the resin and reaction conditions. In embodiments, the resin is a polyester resin having an acid number from about 2 mg KOH/g of resin to about 200 mg KOH/g of resin, from about 5 mg KOH/g of resin to about 50 mg KOH/g of resin, or from about 5 mg KOH/g of resin to about 15 mg KOH/g of resin. The acid containing resin may be dissolved in tetrahydrofuran solution. The acid number may be detected by titration with KOH/methanol solution containing phenolphthalein as the indicator. The acid number may then be calculated based on the equivalent amount of KOH/methanol required to neutralize all the acid groups on the resin identified as the end point of the titration.

In embodiments, the fluorescent yellow toner comprises a core comprising a first solvent yellow 160-incorporated amorphous polyester; a second solvent yellow 160-incorporated amorphous polyester; wherein the first amorphous polyester and the second amorphous polyester are different; and a crystalline polyester; a shell disposed over the core, the shell comprising at least one amorphous polyester; wherein the toner provides printed images having an L* value of greater than 90, an a* value of from about less than −40 to about −20, and a b*value of greater than 75.

In certain embodiments, the first solvent yellow 160-incorporated amorphous polyester is a poly(propoxylated bisphenol-co-terephthalate-fumarate-dodecenylsuccinate) and the second solvent yellow 160-incorporated amorphous polyester is a poly(propoxylated-ethoxylated bisphenol-co-terephthalate-dodecenylsuccinate-trimellitic anhydride).

In certain embodiments, the fluorescent yellow toner herein comprises a core and shell configuration as described herein, wherein the first solvent yellow 160-incorporated amorphous polyester is a poly(propoxylated bisphenol-co-terephthalate-fumarate-dodecenylsuccinate) and the second solvent yellow 160-incorporated amorphous polyester is a poly(propoxylated-ethoxylated bisphenol-co-terephthalate-dodecenylsuccinate-trimellitic anhydride); wherein the core further comprises a third amorphous polyester and a fourth amorphous polyester; wherein the third amorphous polyester is not incorporated with solvent yellow 160; wherein the fourth amorphous polyester is not incorporated with solvent yellow 160; and wherein the third amorphous polyester is a poly(propoxylatedbisphenol-co-terephthalate-fumarate-dodecenylsuccinate) and the fourth amorphous polyester is a poly(propoxylated-ethoxylated bisphenol-co-terephthalate-dodecenylsuccinate-trimellitic anhydride); and wherein the shell comprises a first amorphous polyester and a second amorphous polyester. In certain embodiments, the shell comprises a first amorphous polyester comprising a poly (propoxylated bisphenol-co-terephthalate-fumarate-dodecenylsuccinate) and a second amorphous polyester comprising a poly(propoxylated-ethoxylated bisphenol-co-terephthalate-dodecenylsuccinate-trimellitic anhydride).

Toner.

In order to form the present toners, any of the resins described above may be provided as an emulsion(s), e.g., by using a solvent-based phase inversion emulsification process. The emulsions may then be utilized as the raw materials to form the toners, e.g., by using an emulsion aggregation and coalescence (EA) process.

In the present embodiments, the fluorescent colorant is incorporated into the amorphous polyester latex and then the dyed latex is used to make the toner. While not wishing to be bound by theory, it is believed that incorporating the fluorescent colorant into the latex, in embodiments, the amorphous latex used to prepare the toner core, in specific embodiments, the first amorphous polyester latex and second amorphous polyester latex, makes the colorant uniformly distributed in the toner and enables uniform and bright printed images having the unique L* a* b* values achieved herein.

By first solvent yellow 160-incorporated amorphous polyester as used herein, it is meant that the toner is prepared from a latex comprising a first amorphous resin and solvent yellow 160. By second solvent yellow 160-incorporated amorphous polyester, it is meant that the toner is prepared from a latex comprising a second amorphous resin and solvent yellow 160. While the final toner particle does not per se contain a latex any longer, it is stated that the final toner particle contains a core comprising a first solvent yellow-incorporated amorphous polyester and a second solvent yellow-incorporated amorphous polyester as described in order to specifically described that the toner particle is prepared with the solvent yellow 160-incorporated amorphous resin latexes and so is defined as containing solvent yellow 160-incorporated amorphous resin as distinguished from prior toners where the colorant is not incorporated into the amorphous resin latex as presently done.

To form the present toners, the solvent yellow 160 and first and second amorphous polyester may be provided as a dispersion in a solvent or a solution, e.g., an aqueous surfactant solution. The surfactant may be selected to facilitate homogeneous dispersion of the solvent yellow 160 within the solution. Illustrative surfactants include anionic surfactants such as, diphenyl oxide disulfonate, ammonium lauryl sulfate, sodium dodecyl benzene sulfonate, dodecyl benzene sulfonic acid, sodium alkyl naphthalene sulfonate, sodium dialkyl sulfosuccinate, sodium alkyl diphenyl ether disulfonate, potassium salt of alkylphosphate, sodium polyoxyethylene lauryl ether sulfate, sodium polyoxyethylene alkyl ether sulfate, sodium polyoxyethylene alkyl ether sulfate, triethanolamine polyoxyethylene alkylether sulfate, sodium naphthalene sulfate, and sodium naphthalene sulfonate formaldehyde condensate, and mixtures thereof; and non-ionic surfactants such as, polyvinyl alcohol, methyl cellulose, ethyl cellulose, propyl cellulose, hydroxy ethyl cellulose, carboxy methylcellulose, polyoxyethylene cetyl ether, polyoxyethylene lauryl ether, polyoxyethylene octyl ether, polyoxyethylene nonylphenyl ether, polyoxyethylene oleyl ether, polyoxyethylene sorbitan monolaurate, polyoxyethylene stearyl ether, dialkylphenoxy poly(ethyleneoxy) ethanol, and mixtures thereof.

The present toners may include other additives, e.g., wax, additional colorants Like the solvent yellow 160, these other additives may be added as separate dispersions in forming the toners.

Wax.

Optionally, a wax may also be combined with the solvent yellow 160 and the resin(s) in forming toner particles. The wax may be provided in a wax dispersion, which may comprise a single type of wax or a mixture of two or more different waxes. A single wax may be added, for example, to improve particular toner properties, such as toner particle shape, presence and amount of wax on the toner particle surface, charging and/or fusing characteristics, gloss, stripping, off-set properties, and the like. Alternatively, a combination of waxes can be added to provide multiple properties to the toner composition.

When included, the wax may be present in an amount of, for example, from about 1% to about 25% by weight of the toner or from about 5% to about 20% by weight of the toner particles.

When a wax is used, the wax may include any of the toners. Waxes that may be selected include waxes having, for example, an average molecular weight of from about 500 to about 20,000 or from about 1,000 to about 10,000. Waxes that may be used include, for example, polyolefins such as polyethylene including linear polyethylene waxes and branched polyethylene waxes, polypropylene including linear polypropylene waxes and branched polypropylene waxes, polymethylene waxes, polyethylene/amide, polyethylenetetrafluoroethylene, polyethylenetetrafluoroethylene/amide, and polybutene waxes such as commercially available from Allied Chemical and Petrolite Corporation, for example POLYWAX™ polyethylene waxes such as commercially available from Baker Petrolite, wax emulsions available from Michaelman, Inc. and the Daniels Products Company, EPOLENE N-15™ commercially available from Eastman Chemical Products, Inc., and VISCOL 550-P™, a low weight average molecular weight polypropylene available from Sanyo Kasei K. K.; plant-based waxes, such as carnauba wax, rice wax, candelilla wax, sumacs, jojoba oil; animal-based waxes, such as beeswax; mineral-based waxes and petroleum-based waxes, such as montan wax, ozokerite, ceresin, paraffin wax, microcrystalline wax such as waxes derived from distillation of crude oil, silicone waxes, mercapto waxes, polyester waxes, urethane waxes; modified polyolefin waxes (such as a carboxylic acid-terminated polyethylene wax or a carboxylic acid-terminated polypropylene wax); Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetrabehenate; ester waxes obtained from higher fatty acid and multivalent alcohol multimers, such as diethylene glycol monostearate, dipropylene glycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that may be used include, for example, amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 9™, POLYSILK14™ available from Micro Powder Inc., mixed fluorinated, amide waxes, such as aliphatic polar amide functionalized waxes; aliphatic waxes consisting of esters of hydroxylated unsaturated fatty acids, for example MICROSPERSION 19™ also available from Micro Powder Inc., imides, esters, quaternary amines, carboxylic acids or acrylic polymer emulsion, for example JONCRYL 74™ 89™, 13™ 537™ and 538™, all available from SC Johnson Wax, and chlorinated polypropylenes and polyethylenes available from Allied Chemical and Petrolite Corporation and SC Johnson wax. Mixtures and combinations of the foregoing waxes may also be used in embodiments. Waxes may be included as, for example, fuser roll release agents. In embodiments, the waxes may be crystalline or non-crystalline.

In embodiments, the wax may be incorporated into the toner in the form of one or more aqueous dispersions of solid wax in water, where the solid wax particle size may be in the range of from about 100 to about 300 nanometers (nm).

Colorants.

The present toners contain a fluorescent yellow colorant which, when combined with the amorphous polyesters as described herein result in a toner which provides certain unique L* a* b* coordinates. The colorant can be solvent yellow 160 and its derivatives. In embodiments, the colorant is selected from the group consisting of solvent yellow 160, solvent yellow 160:1, and combinations thereof. In specific embodiments, the colorant is solvent yellow 160. In specific embodiments, the colorant is solvent yellow 160:1.

The fluorescent yellow colorant is combined with the first amorphous polyester in a latex containing the fluorescent yellow colorant and the first amorphous polyester which latex is then used to form the toner. The fluorescent yellow colorant is combined with the second amorphous polyester in a latex containing the fluorescent yellow colorant and the second amorphous latex which latex is then used to form the toner.

Toner Preparation.

In embodiments, the present toners are prepared by emulsion aggregation (EA) processes, such as by a process that includes aggregating a mixture of one or more emulsions, each emulsion comprising a resin; in embodiments an emulsion comprising a first amorphous polyester and solvent yellow 160; an emulsion comprising a second amorphous polyester and solvent yellow 160; and optionally a wax; and then coalescing the mixture. In embodiments, a crystalline polyester is provided, in embodiments in a separate emulsion. In embodiments, the crystalline polyester comprises C10:C9 polyester. As described above, the first amorphous polyester and solvent yellow 160 and the second amorphous polyester and solvent yellow 160 may be utilized as separate aqueous dispersions. In embodiments, a latex comprising the first amorphous polyester, the second amorphous polyester, and the solvent yellow 160 may be employed.

In embodiments, a process herein comprises combining a first amorphous polyester, a second amorphous polyester, wherein the first amorphous polyester and the second amorphous polyester are different, water, and solvent yellow 160 to prepare a fluorescent latex comprising a first solvent yellow 160-incorporated amorphous polyester and a second solvent yellow 160-incorporated amorphous polyester; optionally, adding an aggregating agent to the fluorescent latex; heating the fluorescent latex to form aggregated particles; adding a shell resin to the aggregated toner particles, the shell comprising at least one amorphous polyester; and heating to coalesce the particles forming coalesced toner particles; and recovering the coalesced toner particles; wherein the toner provides printed images having an L* value of greater than 90, an a* value of from about less than −40 to about −20, and a b* value of greater than 75.

In embodiments, the process herein further comprises adding a third amorphous polyester and a fourth amorphous polyester prior to aggregating; wherein the third amorphous polyester is not incorporated with solvent yellow 160; wherein the fourth amorphous polyester is not incorporated with solvent yellow 160; and wherein the third amorphous polyester and the fourth amorphous polyester are different. In embodiments, the third amorphous polyester is a poly(propoxylated bisphenol-co-terephthalate-fumarate-dodecenylsuccinate) and the fourth amorphous polyester is a poly(propoxylated-ethoxylated bisphenol-co-terephthalate-dodecenylsuccinate-trimellitic anhydride).

The mixture may be homogenized which may be accomplished by any suitable or desired process, such as by mixing at about 600 to about 6,000 revolutions per minute. Homogenization may be accomplished by any suitable means, including, for example, with an IKA ULTRA TURRAX TSO probe homogenizer.

Following the preparation of the above mixture, in embodiments, the first latex comprising the first amorphous polyester and solvent yellow 160, the second latex comprising the second amorphous polyester and solvent yellow 160, a third latex comprising the crystalline polyester, an aggregating agent may be added to the mixture. Alternately, the crystalline polyester may be added to one or both of the amorphous polyester-solvent yellow 160 containing latexes. Any suitable aggregating agent may be utilized. Suitable aggregating agents include, for example, aqueous solutions of a divalent agent may be, for example, an inorganic cationic aggregating agent such as a polyaluminum halide such as polyaluminum chloride (PAC), or the corresponding bromide, fluoride, or iodide; a polyaluminum silicate such as polyaluminum sulfosilicate (PASS); or a water soluble metal salt including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, and copper sulfate; or combinations thereof. The aggregating agent may be added to the mixture at a temperature that is below the glass transition temperature (Tg) of the resin (s). The aggregating agent may be added to the mixture under homogenization.

The aggregating agent may be added to the mixture in any suitable or desired amount, in embodiments, in an amount of, for example, from about 0% to about 10% by weight of the resin, from about 0.2% to about 8% by weight of the resin, or from about 0.5% to about 5% by weight of the resin.

The particles of the mixture may be permitted to aggregate until a predetermined desired particle size is obtained. A predetermined desired size refers to the desired particle size to be obtained as determined prior to formation, and the particle size being monitored during the growth process until such particle size is reached. Samples may be taken during the growth process and analyzed, for example with a Coulter Counter, for volume average particle size. The aggregation thus may proceed by maintaining an elevated temperature, or slowly raising the temperature to, for example, in embodiments, from about 30° C. to about 100° C., in embodiments from about 30° C. to about 80° C., or in embodiments from about 30° C. to about 50° C. The temperature may be held for a period time of from about 0.5 hours to about 6 hours, or in embodiments from about hour 1 to about 5 hours, while stirring, to provide the aggregated particles. Once the predetermined desired particle size is reached, a shell may be added. The volume average particle size of the particles prior to application of a shell may be, for example, from about 3 micrometers (μm) to about 10 μm, in embodiments, from about 4 μm to about 9 μm, or from about 6 μm to about 8 μm.

Shell Resin.

After aggregation, but prior to coalescence, a resin coating may be applied to the aggregated particles to form a shell thereover. Any of the resins described above may be utilized in the shell. In embodiments, an amorphous polyester resin is utilized in the shell. In embodiments, the shell comprises a first amorphous polyester and a second amorphous polyester. In embodiments, the shell comprises a first amorphous polyester and a second amorphous polyester and is free of other resins. In embodiments, two amorphous polyester resins are utilized in the shell, e.g., in substantially equal amounts. In embodiments, a crystalline polyester resin and two different types of amorphous polyester resins are utilized in the core and the same two types of amorphous polyester resins are utilized in the shell.

In certain embodiments, the shell comprises a first amorphous polyester comprising a poly(propoxylated bisphenol-co-terephthalate-fumarate-dodecenylsuccinate) and a second amorphous polyester comprising a poly(propoxylated-ethoxylated bisphenol-co-terephthalate-dodecenylsuccinate-trimellitic anhydride).

The shell may be applied to the aggregated particles by using the shell resins in the form of emulsion(s) as described above. Such emulsions may be combined with the aggregated particles under conditions sufficient to form a coating over the aggregated particles. For example, the formation of the shell over the aggregated particles may occur while heating to a temperature of from about 30° C. to about 80° C. or from about 35° C. to about 70° C. The formation of the shell may take place for a period of time from about 5 minutes to about 10 hours or from about 10 minutes to about 5 hours.

Once the desired size of the toner particles is achieved, the pH of the mixture may be adjusted with a pH control agent, a base, to a value of from about 3 to about 10, or in embodiments from about 5 to about 9. The adjustment of the pH may be utilized to freeze, that is to stop, toner growth. The base utilized to stop toner growth may include any suitable base such as, for example, alkali metal hydroxides such as, for example, sodium hydroxide, potassium hydroxide, ammonium hydroxide, combinations thereof, and the like. In embodiments, a chelating agent such as ethylene diamine tetraacetic acid (EDTA) may be added to help adjust the pH to the desired values noted above. Other chelating agents may be used.

In embodiments, the size of the core-shell toner particles (prior to coalescence) may be from about 3 μm to about 10 μm, from about 4 μm to about 10 μm, or from about 6 μm to about 9 μm.

Coalescence.

Following aggregation to the desired particle size and application of the shell, the particles may then be coalesced to the desired final shape, the coalescence being achieved by, for example, heating the mixture to a temperature of from about 45° C. to about 150° C., from about 55° C. to about 99° C., or about 60° C. to about 90° C., which may be at or above the glass transition temperature of the resins utilized to form the toner particles. Heating may continue or the pH of the mixture may be adjusted (e.g., reduced) over a period of time to reach the desired circularity. The period of time may be from about 1 hours to about 5 hours or from about 2 hours to about 4 hours. Various buffers may be used during coalescence. The total time period for coalescence may be from about 1 to about 9 hours, from about 1 to about 8 hours, or from about 1 to about 5 hours. Stirring may be utilized during coalescence, for example, from about 20 rpm to about 1000 rpm or from about 30 rpm to about 800 rpm.

After aggregation and/or coalescence, the mixture may be cooled to room temperature. The cooling may be rapid or slow, as desired. A suitable cooling process may include introducing cold water to a jacket around the reactor. After cooling, the toner particles may be screened with a sieve of a desired size, filtered, washed with water, and then dried. Drying may be accomplished by any suitable process for drying including, for example, freeze-drying.

Other Additives.

In embodiments, the present toners may also contain other optional additives. For example, the toners may include positive or negative charge control agents. Surface additives may also be used. Examples of surface additives include metal oxides such as titanium oxide, silicon oxide, aluminum oxides, cerium oxides, tin oxide, mixtures thereof, and the like; colloidal and amorphous silicas, such as AEROSIL®, metal salts and metal salts of fatty acids such as zinc stearate, calcium stearate, and magnesium stearate, mixtures thereof and the like; long chain alcohols such as UNILIN™ 700; and mixtures thereof.

Each of these surface additives may be present in an amount of from about 0.1% to about 5% by weight of the toner or from about 0.25% by weight to about 3% by weight of the toner. In embodiments, the toner may comprise, for example, from about 0.1% to about 5% of titania by weight of the toner, from about 0.1% to about 8% of silica by weight of the toner, from about 0.1% to about 5% of colloidal silica by weight of the toner, from about 0.05% to about 4% of zinc stearate by weight of the toner, and from about 0.1% to about 4% of cerium oxide by weight of the toner.

Toner Characteristics.

In embodiments, the dry toner particles, exclusive of external surface additives, exhibit one or more of the following characteristics:

(1) Volume average particle size of from about 5.0 μm to about 10.0 μm, from about 6.0 μm to about 10.0 μm, or from about 7.0 μm to about 9.0 μm.

(2) Number Average Geometric Size Distribution (GSDn) and/or Volume Average Geometric Size Distribution (GSDv) of from about 1.05 to about 1.55, from about 1.10 to about 1.40, or from about 1.10 to about 1.35.

(3) Circularity of from about 0.90 to about 1.00, from about 0.92 to about 0.99, or from about 0.95 to about 0.98.

These characteristics may be measured according to the techniques described in the Example, below, or according to techniques as known to those of skill in the art.

The present toners may possess excellent charging characteristics under a variety of relative humidity (RH) conditions, for example, a low-humidity zone (J-zone) of 21.1° C./10% RH and a high humidity zone (A-zone) of about 28° C./85% RH. Similarly, the present toners may possess excellent flow and blocking characteristics. In embodiments, the toner particles, exclusive of external surface additives, exhibit one or more of the following characteristics:

(4) A-zone charge to diameter ratio (Q/D) of from about −0.10 fC/μm to about 2.0 fC/μm, from about 0.11 fC/μm to 30 about 0.19 fC/μm, or from about 0.13 fC/μm to about 0.17 fC/μm.

(5) A-zone charge per mass ratio (Q/M) of from about 1 μC/g to about 20 μC/g from about 5 μC/g to about 15 μC/g, or from about 5 μC/g to about 10 K/g.

(6) J-zone charge to diameter ratio (Q/D) of from about 0.90 fC/μm to about 2.0 fC/μm, from about 0.92 fC/μm to about 1.0 fC/μm, or from about 0.94 fC/μm to about 0.99 fC/μm.

(7) J-zone charge per mass ratio (Q/M) of from about 20 40 μC/g to about 60 μC/g, from about 25 μC/g to about 50 μC/g, or from about 30 μC/g to about 50 μC/g.

In embodiments, the toner particles, inclusive of external surface additives, exhibit one or more of the following characteristics:

(8) Charge maintenance in A-zone after 24 hours in the range of from about 70% to about 80%, from about 72% to about 80%, or from about 74% to about 80%.

(9) Charge maintenance in A-zone after 7 days in the range of from about 50% to about 60%, from about 52% to about 58%, or from about 53% to about 58%.

(10) Cohesion in the range of from about 5% to about 15%, of from about 6% to about 12%, or of from about 7% to about 10%.

(11) Onset of blocking temperature of greater than about 55° C., greater than about 56° C., greater than about 57° C., or in the range of from about 56° C. to about 58° C.

(12) Dielectric loss (×1000) in the range of from about 20 to about 40, from about 22 to about 38, or from about 23 to about 35.

The present toners may possess excellent fusing characteristics as reflected by one or more of the following: gloss temperature to reach a gloss of 40, peak gloss, cold offset temperature, hot offset temperature, and minimum fix temperature (MFT). In embodiments, the toner particles, inclusive of external surface additives, exhibit a MFT of no more than about 130° C., no more than about 128° C., no more than about 127° C., or a MFT in the range of about 120° C. to about 130° C.

In embodiments, the present toners provide a printed image having certain unique L* a* b* values.

The CIELAB color space (also known as CIE L*a*b* or sometimes abbreviated as simply "Lab" color space) is a color space defined by the International Commission on Illumination (CIE) in 1976. It expresses color as three values: L* for the lightness from black (0) to white (100), a* from green (−) to red (+), and b* from blue (−) to yellow (+).

Because three parameters are measured, the space itself is a three-dimensional real number space, which allows for infinitely many possible colors. In practice, the space is usually mapped onto a three-dimensional integer space for digital representation, and thus the L*, a*, and b* values are usually absolute, with a pre-defined range. The lightness value, L*, represents the darkest black at L*=0, and the brightest white at L*=100. The color channels, a* and b*, represent true neutral gray values at a*=0 and b*=0. The a* axis represents the green-red component, with green in the negative direction and red in the positive direction. The b* axis represents the blue-yellow component, with blue in the negative direction and yellow in the positive direction. The scaling and limits of the a* and b* axes will depend on the specific implementation, but they often run in the range of ±100 or −128 to +127 (signed 8-bit integer). For further information, see the online encyclopedia, Wikipedia, at https://en.wikipedia.org/wiki/CIELAB_color_space.

In embodiments, the particular combination of toner components, in particular the solvent yellow-incorporated amorphous polyester, provides a toner which can produce images having a bright fluorescent yellow that provides high visibility and attention getting. The images produced with the toner herein are on par with the colors known as Optic Yellow or Luis Lemon. In embodiments, toner images prepared with the present toners have an L* a* b* value in line with Luis Lemon and Optic Yellow. For comparison, Luis Lemon has a Lab of L* 95.62, a* of −29.55, and b* of 84.76. Optic Yellow, the color famously used for tennis balls, has an L* of 96.75, a* of −29.82, and b* of 102.6.

The present toner provides fluorescent images having both high visibility and attention getting qualities. The toners have L (brightness), a (greener=negative), and b (yellower+positive) coordinates almost identical to the known popular but previously unavailable in a toner colors such as Optic Yellow or Luis Lemon.

In embodiments, the toners herein provide images having L values in the high 90s, a values in the low −20s, and b values in the high 80s to 100. In embodiments, the toners herein provide printed images having an L* value of greater than 90, an a* value of from about less than −40 to about −20, and a b* value of greater than 75.

Two settings that are typically used with the X-Rite ILS to measure Lab values are M0 (white light and undefined UV) and M1 (white light and defined UV). M0 is most commonly used for assessing base color. M1 is most commonly used for assessing a measure of fluorescence. a* defines the greenish hue in the toner formulation. In embodiments, the present toner provides the following values when measured using the X-Rite ILS in M0 and M1 settings:

TABLE 1

| | L* | a* | b* |
|---|---|---|---|
| X-Rite ILS M0 | >90 | −20 to −30 | >75 |
| X-Rite ILS M1 | >95 | −30 to −40 | >75 |

In certain embodiments, the present toner provides toner images having an L* value of from about 95 to about 99, an a* value of from about −29 to about −25, and a b*value of from about 77 to about 100. In further embodiments, the present toner provides toner images having an L* value of from about 96 to about 99, an a* value of from about −27 to about −26, and a b* value of from about 77 to about 79. In a specific embodiment, the present toner provides toner images having an L* of 97, an a* of −27, and a b* of 79.

Developers and Carriers.

The present toners may be formulated into a developer composition. Developer compositions can be prepared by mixing the toners of the present disclosure with known carrier particles, including coated carriers, such as steel, ferrites, and the like. Such carriers include those disclosed in U.S. Pat. Nos. 4,937,166 and 4,935,326, the entire disclosures of each of which are incorporated herein by reference.

The toners may be present in the carrier in amounts of from about 1% to about 15% by weight, from about 2% to about 8% by weight, or from about 4% to about 6% by weight. The carrier particles can also include a core with a polymer coating thereover, such as polymethylmethacrylate (PMMA), having dispersed therein a conductive component like conductive carbon black. Carrier coatings include silicone resins such as methyl silsesquioxanes, fluoropolymers such as polyvinylidiene fluoride, mixtures of resins not in close proximity in the triboelectric series such as polyvinylidiene fluoride and acrylics, thermosetting resins such as acrylics, mixtures thereof and other known components.

Applications.

The present toners may be used in a variety of xerographic processes and with a variety of xerographic printers. A xerographic imaging process includes, for example, preparing an image with a xerographic printer comprising a charging component, an imaging component, a photoconductive component, a developing component, a transfer component, and a fusing component. In embodiments, the development component may include a developer prepared by mixing a carrier with any of the toners described herein. The xerographic printer may be a high speed printer, a black and white high speed printer, a color printer, and the like. Once the image is formed with the toners/developers, the image may then be transferred to an image receiving medium such as paper and the like. Fuser roll members may be used to fuse the toner to the image-receiving medium by using heat and pressure. Use of the present toners with a xerographic printing process can provide fluorescent printed images having the characteristics described herein including the brightness and L* a* b* coordinate values described herein.

The present toners find use in other applications such as powder coating applications in which a powder spray gun (e.g., a tribo gun) containing any of the present toners is used to deliver the toner to a substrate.

In embodiments, a process herein for using a fluorescent yellow toner, wherein the toner comprises a core comprising a first solvent yellow 160-incorporated amorphous polyester; a second solvent yellow 160-incorporated amorphous polyester; wherein the first amorphous polyester and the second amorphous polyester are different; and a crystalline polyester; a shell disposed over the core, the shell comprising at least one amorphous polyester; the process comprises: forming an image comprising the fluorescent yellow toner sing a xerographic printer; transferring the image comprising the fluorescent yellow toner to an image receiving medium; and fusing the fluorescent yellow toner to the image receiving medium to form a toner image; wherein the toner provides printed images having an L* value of greater than 90, an a* value of from about less than −40 to about −20, and a b* value of greater than 75. In further embodiments, the process results in a print having one or more of the L* a* b* values as described hereinabove.

In embodiments, provided herein is a process for printing one or more, and in certain embodiments, at least four high visibility elements at once using one or more of a combination of the Xerox® iGen® Press, in embodiments, the Xerox® iGen® 5 Press, the Xerox® iGen® Press having long sheets capability (large size), in combination with the present fluorescent yellow toner which provides high brightness and a unique color.

Previously, images were limited to about 11.69 inches by 8.27 inches, or 14.3 inches by 26 inches. The present process includes printing very long sheets, up to 53 inches, with the fluorescent toner described herein. In embodiments, the method herein comprises printing a toner image wherein the toner image is a long sheet image of up to about 14.33 inches wide and up to about 35 inches in length. In further embodiments, the method herein comprises printing a toner image wherein the toner image is a long sheet image of up to about 14.33 inches wide and up to about 53 inches in length.

The process can be carried out, in embodiments, using the toners described herein in the apparatus described in U.S. patent application Ser. No. 16/180,713, incorporated by reference herein in its entirety, and U.S. patent application Ser. No. 16/180,762, incorporated by reference herein in its entirety.

In embodiments, the process herein includes printing the yellow fluorescent toner in a device modified so that the fuser is relocated from prior conventional locations to its own module downstream from the Print Engine Tower. For further detail, see U.S. patent application Ser. No. 16/180,713 and U.S. patent application Ser. No. 16/180,762.

Thus, the present fluorescent toner and toner process enable the printing of very long sheets, up to about 53 inches, which is believed to be the longest currently available capacity. This is more than two times the 26 inch base previously available. Using the present fluorescent yellow toner in combination with the present process is believed to enable print productivities up to 25 percent higher than previous print engines. It is believed that a twenty percent increase in 12×18 inch throughput is achievable. The present fluorescent yellow toner in combination with the larger size and increased productivity enables prints that "grab attention" due to the color and brightness, and in embodiments, further enhanced by the combination of larger size. The fluorescent yellow toner achieves a unique attention-getting color.

EXAMPLES

The following Examples are being submitted to further define various species of the present disclosure. The Examples are intended to be illustrative only and are not intended to limit the scope of the present disclosure. Also, parts and percentages are by weight unless otherwise indicated.

Example 1

Preparation of solvent yellow 160 incorporated amorphous polyester emulsion. A mixture of 240 grams of an amorphous polyester resin (propoxylated bisphenol A fumarate/terephthalate), and 4.9 grams of solvent yellow 160 was dissolved in a mixture of methyl-ethyl-ketone, isopropyl-alcohol and aqueous ammonia solution with a ratio of (145/48/40 grams) in a 2 L reactor at 50° C. Additional ammonia solution may be needed to completely neutralize the polyester resin. To this solution was added 320 grams deionized water containing surfactants (Calfax® DB-45 from Pilot Chemical Company) to form emulsion. The reactor was charged with a distillation column and the organic solvent was distilled off. Finally, the resulting emulsion was filtered through a 25 μm sieve. The emulsion had an average particle size of 203 nanometers, and the solids content was about 41%. The solvent yellow 160 content in the emulsion was about 2%.

Example 2

Preparation of fluorescent toner particles with solvent yellow 160 incorporated emulsion. The fluorescent emulsion made by Example I (225.2 grams) was mixed with one type of amorphous polyester emulsion (132.4 grams, 40% solid content), another type of amorphous polyester emulsion (132.4 grams, 40% solid content), another emulsion containing crystalline polyester (47.4 grams, 43% solid content) and deionized water (920.8 grams). After acidifying the mixture, aluminum sulfate solution was slowly added while homogenizing. The resulting highly viscose mixture was transferred into a 2 L reactor and the aggregation was initiated by increasing the temperature to about 45° C. When the particle size reached to 7.2 μm, emulsions including the two amorphous polyesters (107.2 grams, each) were added after acidification to pH 4.5 to form a shell over the particles and the particles were allowed to continue grow to about 8.5 μm. The particles were frozen by adding EDTA and sodium hydroxide aqueous solution. The reaction temperature was increased and coalescence started at about 84° C. The heating was stopped when the particle circularity reached 0.965±0.005. The particle slurry was quenched by lowering the temperature to below 40° C., then screened with 20-μm sieve, and filtered under vacuum. The resulting particles were washed with deionized water and dried.

Comparative Example 3

Preparation of fluorescent toner particle with solvent yellow 160 dye-direct dye mix. The solvent yellow 160:1 dye powder (obtained from DayGlo Color Corp.) was dispersed by sonication into an aqueous surfactant solution. The surfactant was branched sodium diphenyl oxide disulfonate (Calfax® DB-45 from Pilot Chemical Company). A 9.0 pph surfactant to dye ratio was used. The dye powder dispersion (56.1 grams, 3.5% solid content) was mixed with one type of amorphous polyester emulsion (247.3 grams, 40% solid content), another type of amorphous polyester emulsion (247.3 grams, 40% solid content), another emulsion containing crystalline polyester (47.4 grams 43% solid content) and deionized water (864.5 grams). After acidifying the mixture, aluminum sulfate solution was slowly added while homogenizing. The resulting highly viscose mixture was transferred into a 2 L reactor and the aggregation was initiated by increasing the temperature to about 45° C. When the particle size reached to 7.2 μm, emulsions including the two amorphous polyesters (107.2 grams each) were added after acidification to pH 4.5 to form a shell over the particles and the particles were allowed to continue grow to about 8.5 μm. The particles were frozen by adding EDTA and sodium hydroxide aqueous solution. The reaction temperature was increased and coalescence started at about 84° C. The heating was stopped when the particle circularity reached 0.965±0.005. The particle slurry was quenched by lowering the temperature to below 40° C., then screened with 20-μm sieve, and filtered under vacuum. The resulting particles were washed with deionized water and dried.

Toner Characterization.

Toner particle size was analyzed from dry toner particles, exclusive of external surface additives, using a Beckman Coulter Multisizer 3 operated in accordance with the manufacturer's instructions. Representative sampling occurred as follows: a small amount of toner sample, about 1 gram, was obtained and filtered through a 25 μm screen, then put in isotonic solution to obtain a concentration of about 10%, with the sample then run in the multisizer. The volume average particle size for the toners was in the range of from about 7.5 μm to about 8.5 μm.

Circularity was analyzed from dry toner particles, exclusive of external surface additives, using a Sysmex 3000 operated in accordance with the manufacturer's instructions. Circularity for the toner was in the range of about 0.960 to about 0.970.

Toner Additive Blending.

Samples were prepared by adding about 50 grams of the toner to an SKM mill along with an additive package including silica, titania and zinc stearate and then blended for about 30 seconds at approximately 12500 rpm. Surface additives were 3.5% NA50SH silica, 1.6% SMT5103 titania, 0.2% H2050 silica, and 0.5% zinc stearate, based on the total weight of the toner.

Bench color characterization.

The bench color characterization was measured using surrogate particle deposition samples. The sample was prepared by dispersing a quantitative amount of toner particles based on different DMA (developed mass per unit area), followed by depositing the particles on a filter paper applied vacuum. After the particles were dried, the particles on filer paper were passed a fuser at 180° C. to fix on paper. The fused patches with DMA from 0.25 to 1.10 was subject to color measurement.

FIG. 1 is a graph showing reflectance (y-axis) versus wavelength (nanometer, x-axis) for the prints prepared with the fluorescent yellow toner of the present embodiments and for cyan, magenta, regular yellow, black, and white. It can be seen that the present fluorescent yellow toner is about 20 percent brighter than white and provides a reflectance that is higher than current CMYK toner.

Figure 2:
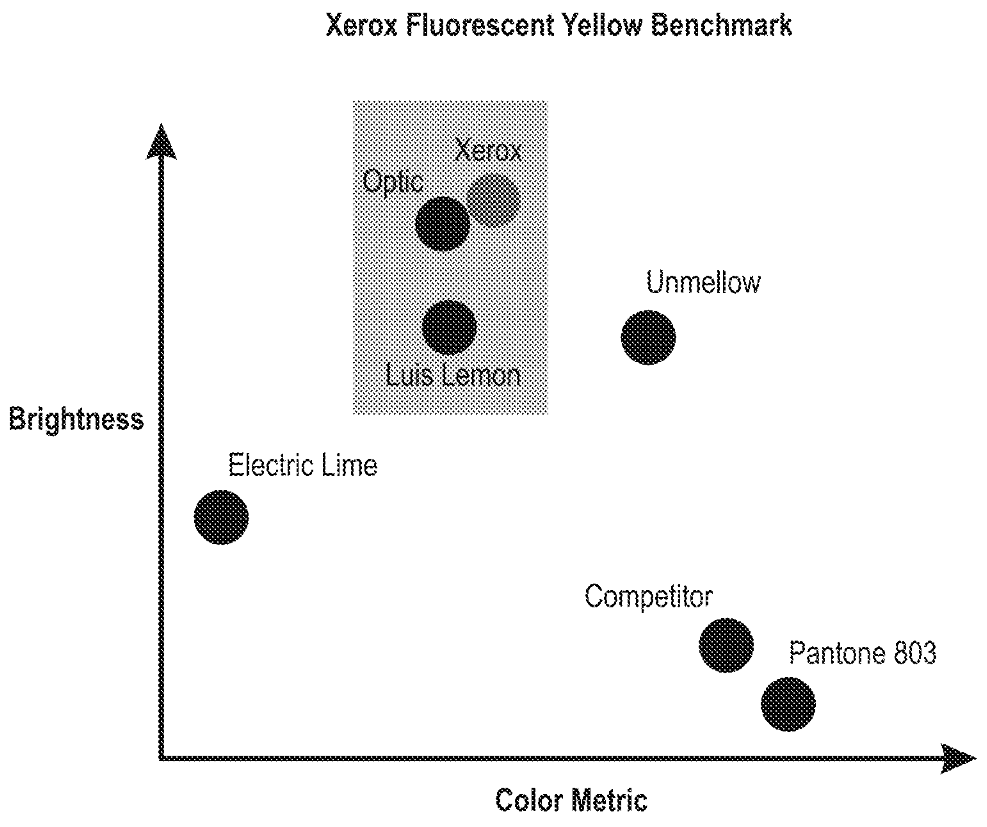
FIG. 2 is a picture showing where on a graphic the fluorescent yellow toner of the present embodiments sits compared to the famous Optic Yellow and Luis Lemon colors as well as comparative colors.

FIG. 2 is a graphic pictorially showing brightness (y-axis) versus color metric (x-axis) for the Xerox® fluorescent toner of the present embodiments versus Optic Yellow, Luis Lemon, Electric Lime, Unmellow Yellow, a commercially available yellow, and Pantone 803 yellow. The present yellow fluorescent toner has an L* 97.01 and an a* −27.19.

Thus, the present yellow fluorescent toner achieves images comparable to the famous Optic Yellow (L8 96.75, a* −29.82) and Luis Lemon (L* 95.62, a* −29.55). In comparison, the color known as Electric Lime has a L* 93.61 and a* −41.99, the color known as Unmellow Yellow has an L* 95.53 a* 18.44, a commercially available yellow has an L* 92.19, a* −14.38, Pantone 803 has an L* 91.47 and an a* −10.91.

The color characterization results (FIGS. 3-7) clearly showed the advantages of the toner particles made from the fluorescent dye-incorporated-emulsion (Example II) over the particles made directly with fluorescent dye (Comparative Example).

Figure 3:
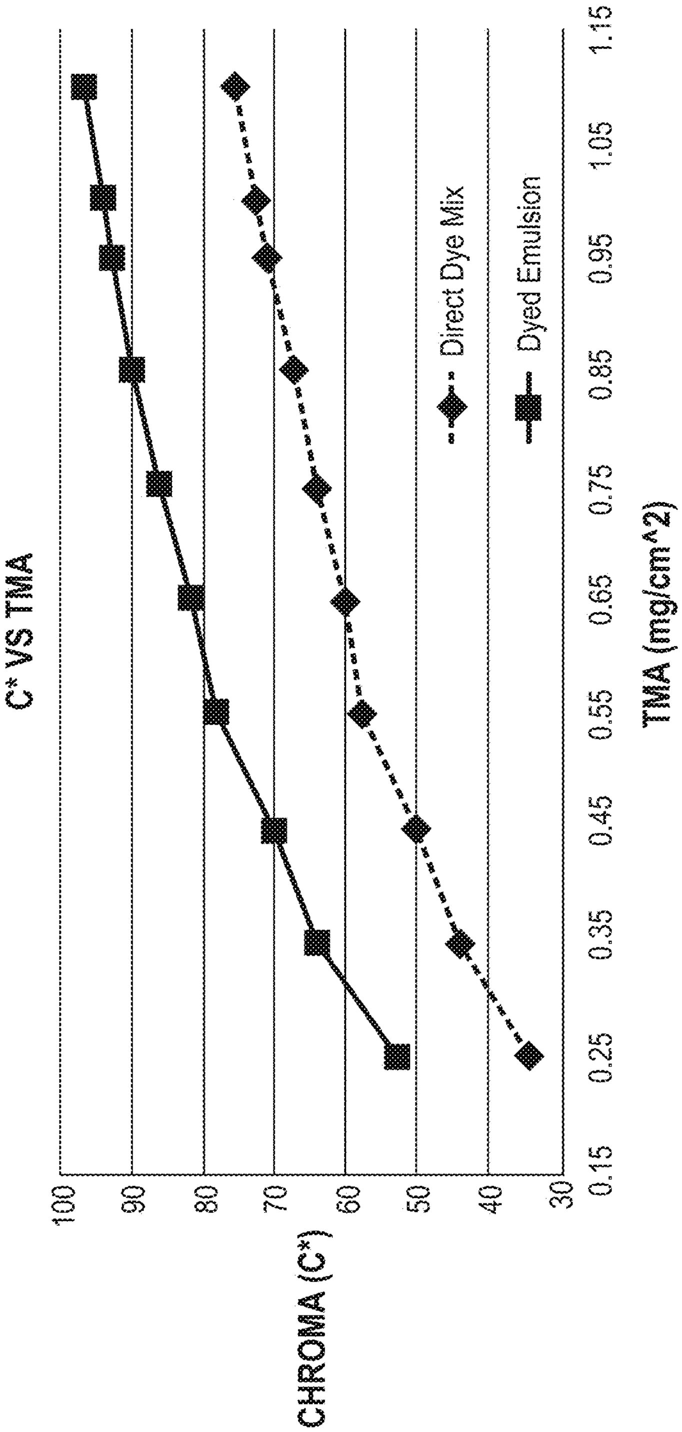
FIG. 3 is a graph showing chroma (y-axis, C*) versus toner mass per unit area (TMA) (x-axis, $mg/cm^2$) for a solvent yellow incorporated emulsion in accordance with the present embodiments versus a comparative direct dye preparation.

FIG. 3 provides a color comparison between toner made by Example 2 (Dye-incorporated emulsion) and Comparative Example (Direct dye). The graph of FIG. 3 shows chroma (y-axis, C*) versus toner mass per unit area (TMA) (x-axis, mg/cm2) for the solvent yellow incorporated emulsion of Example 2 versus the direct dye preparation of Comparative Example 3.

Figure 4:
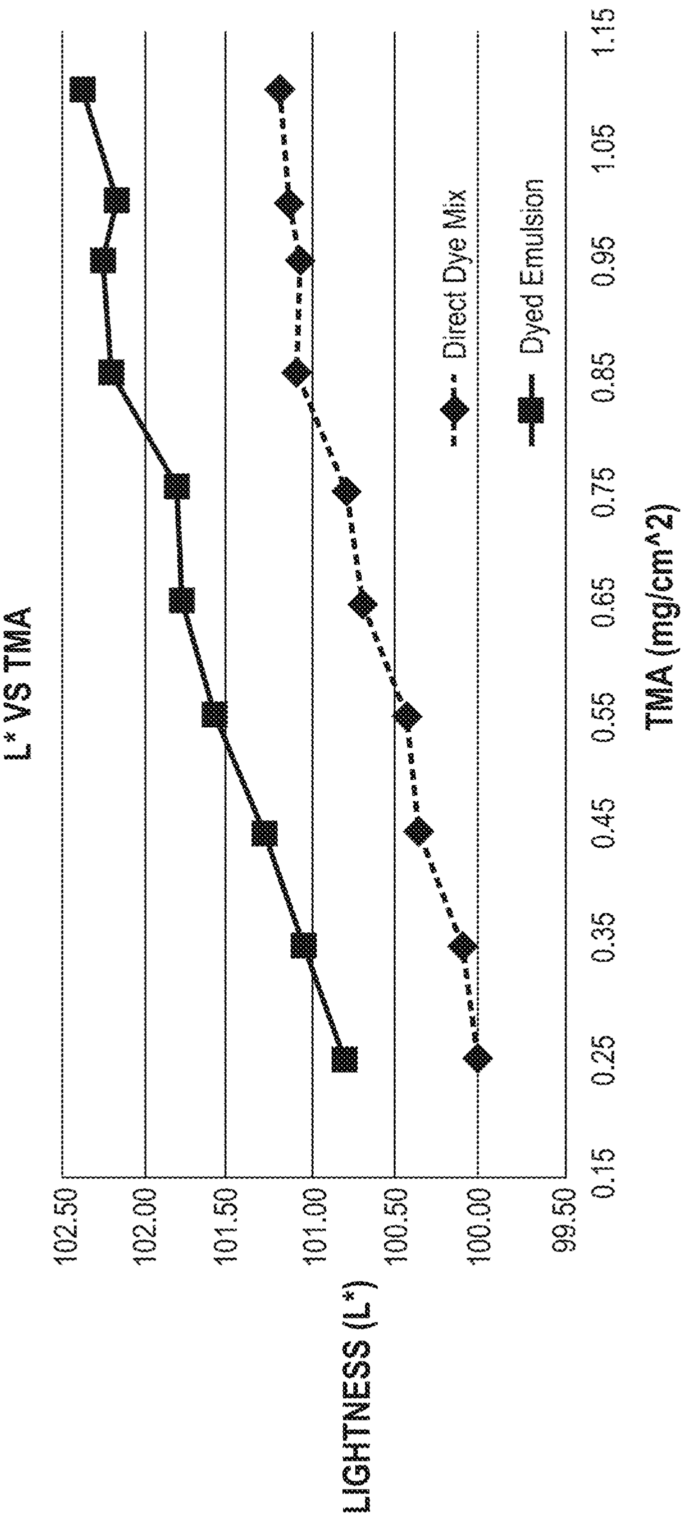
FIG. 4 is a graph showing lightness (y-axis, L*) versus TMA (x-axis, $mg/cm^2$) for a solvent yellow incorporated emulsion in accordance with the present embodiments versus a comparative direct dye preparation.

FIG. 4 is a graph showing lightness (y-axis, L*) versus TMA (x-axis, $mg/cm^2$) for the solvent yellow incorporated emulsion of Example 2 versus the comparative direct dye preparation of Comparative Example 3.

Figure 5:
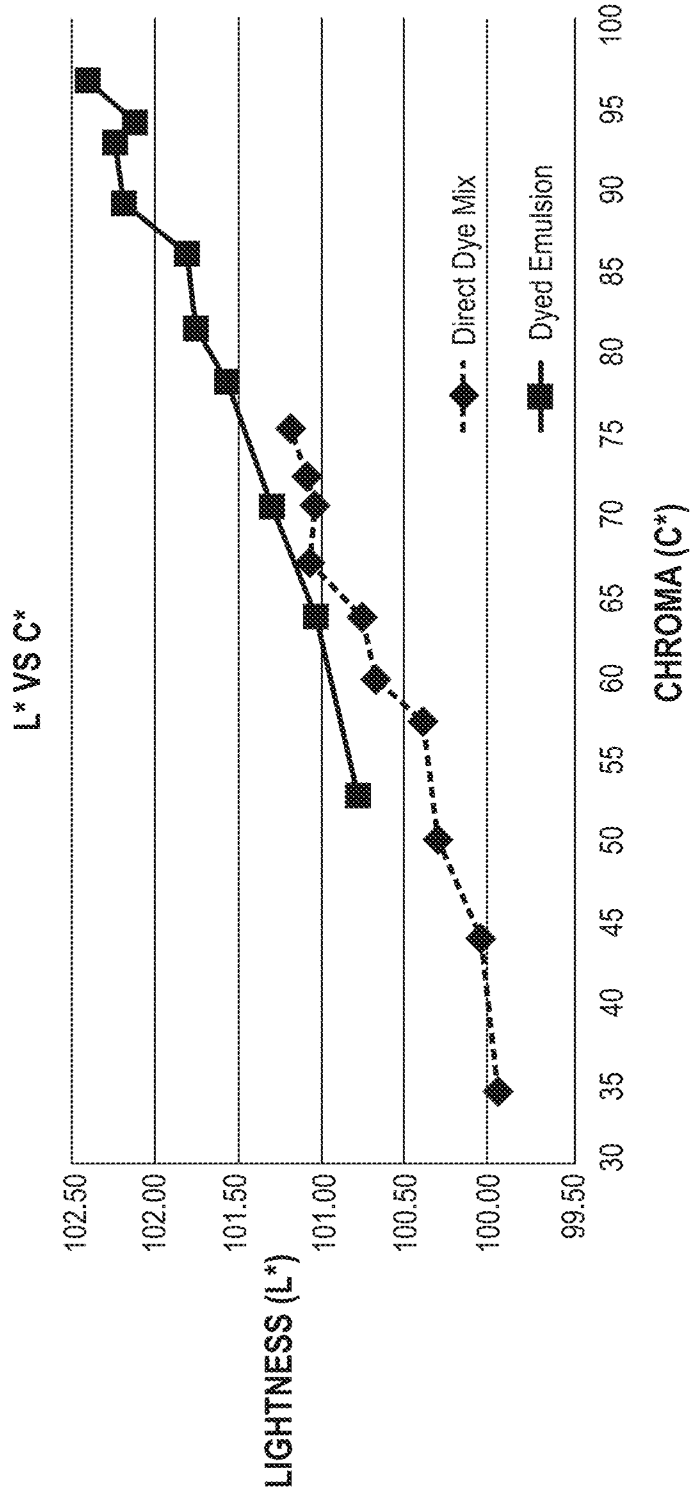
FIG. 5 is a graph showing lightness (y-axis, L*) versus chroma (x-axis, C*) for a solvent yellow incorporated emulsion in accordance with the present embodiments versus a comparative direct dye preparation.

FIG. 5 is a graph showing lightness (y-axis, L*) versus chroma (x-axis, C*) for the solvent yellow incorporated of Example 2 versus the comparative direct dye preparation of Comparative Example 3.

Figure 6:
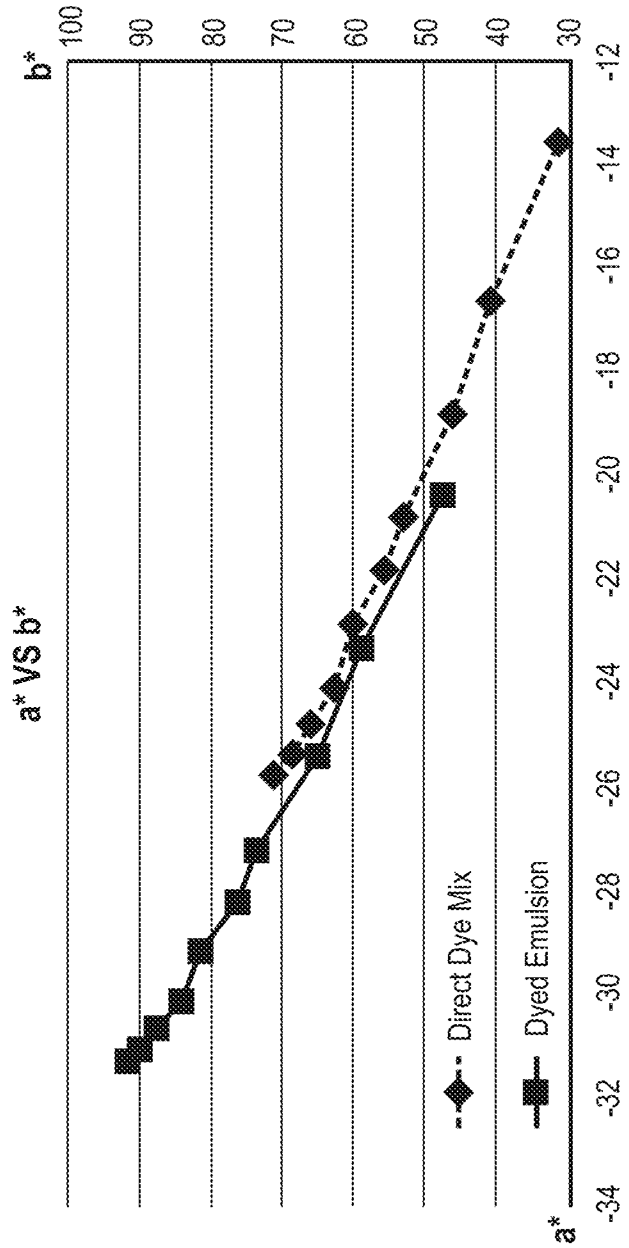
FIG. 6 is a graph showing a* (y-axis) versus b* (x-axis) for a solvent yellow incorporated emulsion in accordance with the present embodiments versus a comparative direct dye preparation.

FIG. 6 is a graph showing a* (y-axis) versus b* (x-axis) for the solvent yellow incorporated emulsion of Example 2 versus the comparative direct dye preparation of Comparative Example 3.

Figure 7:
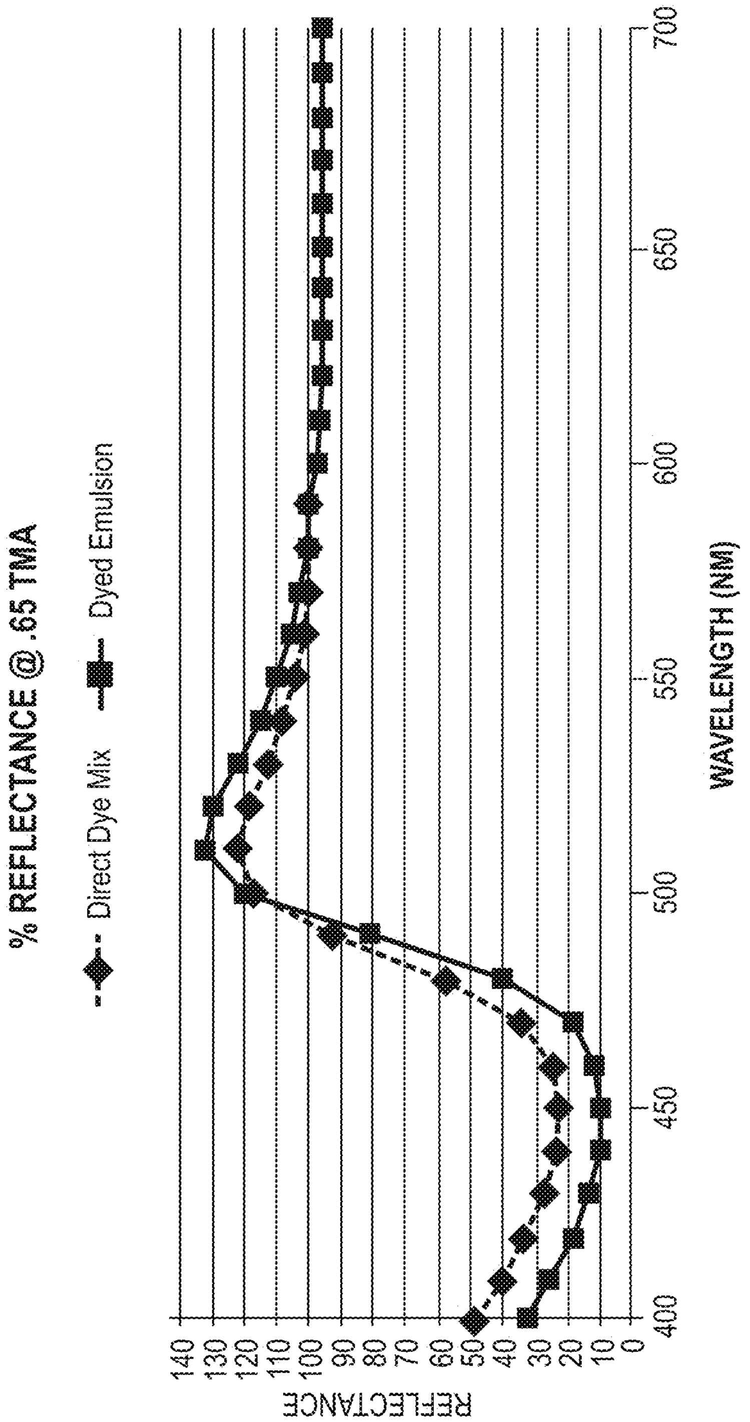
FIG. 7 is a graph showing reflectance (y-axis) versus wavelength (x-axis, nanometers) for a solvent yellow incorporated emulsion in accordance with the present embodiments versus a comparative direct dye preparation.

FIG. 7 provides a reflectance comparison between toner made by Example 2 (Dye-incorporated emulsion) and Comparative Example 3 (Direct dye). The graph of FIG. 7 shows reflectance (y-axis) versus wavelength (x-axis, nanometers) for the solvent yellow incorporated emulsion of Example 2 versus the comparative direct dye preparation of Comparative Example 3.

The dye-incorporated-emulsion showed much better Chroma, higher L* and most importantly enabled optic yellow color space with desired a*b*, while direct-dye particles barely entered the optic yellow color space at every high DMA. The reflectance comparison between the toner particles made with two different method also indicated that the direct dye mix preparation (Comparative Example 3) yielded lower fluorescent intensity than the dye-incorporated emulsion method (Example 2).

The Lab range for the toner of the example was determined using the X-Rite ILS15 eXact in M0 mode. The Lab coordinates measured for the example toner of the present invention were L* 97.01, a* 027.19, b* 78.71.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A fluorescent yellow toner comprising:

a core comprising a first solvent yellow 160-incorporated amorphous polyester; a second solvent yellow 160-incorporated amorphous polyester; wherein the first amorphous polyester and the second amorphous polyester are different; and a crystalline polyester;

wherein the core further comprises a third amorphous polyester and a fourth amorphous polyester;

wherein the third amorphous polyester is not incorporated with solvent yellow 160;

wherein the fourth amorphous polyester is not incorporated with solvent yellow 160; and wherein the third amorphous polyester and the fourth amorphous polyester are different, a shell disposed over the core, the shell comprising at least one amorphous polyester;

wherein the toner provides printed images having an L* value of greater than 90, an a* value of from about less than −40 to about −20, and a b*value of greater than 75.

2. A fluorescent yellow toner comprising:

a core comprising a first solvent yellow 160-incorporated amorphous polyester; a second solvent yellow 160-incorporated amorphous polyester; wherein the first amorphous polyester and the second amorphous polyester are different; and a crystalline polyester;

a shell disposed over the core, the shell comprising at least one amorphous polyester;

wherein the shell comprises a first amorphous polyester comprising a poly(propoxylated bisphenol-co-terephthalate-fumarate-dodecenylsuccinate) and a second amorphous polyester comprising a poly(propoxylated-ethoxylated bisphenol-co-terephthalate-dodecenylsuccinate-trimellitic anhydride);

wherein the toner provides printed images having an L* value of greater than 90, an a* value of from about less than −40 to about −20, and a b*value of greater than 75.

3. A fluorescent yellow toner comprising:

a core comprising a first solvent yellow 160-incorporated amorphous polyester; a second solvent yellow 160-incorporated amorphous polyester; wherein the first amorphous polyester and the second amorphous polyester are different; and a crystalline polyester;

a shell disposed over the core, the shell comprising at least one amorphous polyester;

wherein the core further comprises a third amorphous polyester and a fourth amorphous polyester;

wherein the third amorphous polyester is not incorporated with solvent yellow 160;

wherein the fourth amorphous polyester is not incorporated with solvent yellow 160; and wherein the third amorphous polyester is a poly(propoxylated bisphenol-co-terephthalate-fumarate-dodecenylsuccinate) and the fourth amorphous polyester is a poly(propoxyated-ethoxylated bisphenol-co-terephthalate-dodecenylsuccinate-trimellitic anhydride);

wherein the toner provides printed images having an L* value of greater than 90, an a* value of from about less than −40 to about −20, and a b*value of greater than 75.

4. A fluorescent yellow toner comprising:

a core comprising a first solvent yellow 160-incorporated amorphous polyester; a second solvent yellow 160-incorporated amorphous polyester; wherein the first amorphous polyester and the second amorphous polyester are different; and a crystalline polyester;

a shell disposed over the core, the shell comprising at least one amorphous polyester;

wherein the first solvent yellow 160-incorporated amorphous polyester is a poly(propoxylated bisphenol-co-terephthalate-fumarate-dodecenylsuccinate) and the second solvent yellow 160-incorporated amorphous polyester is a poly(propoxyated-ethoxylated bisphenol-co-terephthalate-dodecenylsuccinate-trimellitic anhydride);

wherein the core further comprises a third amorphous polyester and a fourth amorphous polyester;

wherein the third amorphous polyester is not incorporated with solvent yellow 160;

wherein the fourth amorphous polyester is not incorporated with solvent yellow 160;

wherein the third amorphous polyester is a poly(propoxylated bisphenol-co-terephthalate-fumarate-dodecenylsuccinate) and the fourth amorphous polyester is a poly(propoxyated-ethoxylated bisphenol-co-terephthalate-dodecenyl succinate-trimellitic anhydride); and wherein the shell comprises a first amorphous polyester and a second amorphous polyester;

wherein the toner provides printed images having an L* value of greater than 90, an a* value of from about less than −40 to about −20, and a b*value of greater than 75.

5. A process comprising:

combining a first amorphous polyester, a second amorphous polyester, wherein the first amorphous polyester and the second amorphous polyester are different, water, and solvent yellow 160 to prepare a fluorescent latex comprising a first solvent yellow 160-incorporated amorphous polyester and a second solvent yellow 160-incorporated amorphous polyester;

adding a third amorphous polyester that is not incorporated with solvent yellow 160 to the fluorescent latex;

adding a fourth amorphous polyester that is not incorporated with solvent yellow 160 to the fluorescent latex to the fluorescent latex, wherein the third amorphous polyester and the fourth amorphous polyester are different;

adding a crystalline polyester to the fluorescent latex;

optionally, adding an aggregating agent to the fluorescent latex;

heating the fluorescent latex to form aggregated particles;

adding a shell resin to the aggregated toner particles, the shell comprising at least one amorphous polyester; and heating to coalesce the particles forming coalesced toner particles; and recovering the coalesced toner particles;

wherein the toner provides printed images having an L* value of greater than 90, an a* value of from about less than −40 to about −20, and a b* value of greater than 75.

6. A process for using a fluorescent yellow toner, wherein the toner comprises a core comprising a first solvent yellow 160-incorporated amorphous polyester; a second solvent yellow 160-incorporated amorphous polyester; wherein the first amorphous polyester and the second amorphous polyester are different and a crystalline polyester; wherein the core further comprises a third amorphous polyester and a fourth amorphous polyester; wherein the third amorphous polyester is not incorporated with solvent yellow 160; wherein the fourth amorphous polyester is not incorporated with solvent yellow 160; and wherein the third amorphous polyester and the fourth amorphous polyester are different and a shell disposed over the core, the shell comprising at least one amorphous polyester; the process comprising:

forming an image comprising the fluorescent yellow toner sing a xerographic printer;

transferring the image comprising the fluorescent yellow toner to an image receiving medium; and fusing the fluorescent yellow toner to the image receiving medium to form a toner image;

wherein the toner provides printed images having an L* value of greater than 90, an a* value of from about less than −40 to about −20, and a b* value of greater than 75.

* * * * *